United States Patent Office 2,875,025
Patented Feb. 24, 1959

2,875,025

PROCESS OF FORMING PLUTONIUM SALTS FROM PLUTONIUM OXALATES

Clifford S. Garner, Redondo Beach, Calif., assignor to the United States of America as represented by the United States Atomic Energy Commission No Drawing. Application June 9, 1947
Serial No. 753,568

19 Claims. (Cl. 23—14.5)

This invention relates to a process of converting plutonium oxalate and, more particularly, lower valence plutonium oxalates to other compounds of plutonium by dry conversion methods.

Processes for converting plutonium oxalate to other plutonium compounds are desirable because the pure plutonium oxalate in aqueous slurry is the usual end product in a wet chemistry concentration and decontamination of plutonium made by neutron irradiation of uranium. The conversion processes are necessary in obtaining other desirable compounds of plutonium. They are also desirable for the preparation of pure plutonium metal because, while the plutonium oxalate cannot itself be efficiently converted directly to the pure metal, a number of other compounds such as plutonium halides and especially plutonium tetrafluoride can be so converted. It may be seen that processes for efficiently converting the plutonium oxalate to other compounds are needed.

The object therefore of this invention is to provide methods for quickly and efficiently converting plutonium oxalate to other compounds of plutonium.

A further object of this invention is to provide a method for rapidly converting plutonium oxalate to compounds such as plutonium halides, cyanides and oxides by the methods of dry chemistry.

Still further objects and advantages of this invention will appear in the following description.

The objects of this invention are achieved by heating the dry plutonium oxalate to a high temperature while passing a vapor of a volatile, non-oxygenated, monobasic acid over the heated plutonium oxalate.

When it is desired to form a plutonium halide or cyanide, a hydrohalide or hydrocyanide may be passed over the plutonium oxalate while it is heated. It is desirable to carefully control the oxidation-reduction conditions under which the hydrohalide or hydrocyanide are admitted. When the vapors are passed over the plus three plutonium oxalate under non-oxidizing or reducing conditions or over plus four plutonium oxalate under reducing conditions the plus three salt of the corresponding halide or cyanide is formed. When the plus three oxalate is treated under oxidizing conditions or plus four plutonium oxalate is treated under non-reducing conditions the corresponding plus four salt is formed.

The conditions for efficiently preparing the hydrohalide or hydrocyanide vary with each of these compounds which it is desired to form, while the percent conversion depends upon the conditions used. The following example gives one embodiment of the invention for converting plus three plutonium oxalate in a reducing atmosphere to plus three plutonium chloride.

EXAMPLE I

A 1 gram slurry of hydrated plus three plutonium oxalate is partially dried by passing air over it at a temperature of about 50° C. Drying of the slurry proceeds rapidly because plutonium plus three oxalate is very insoluble in water and hence the water present is substantially at its normal vapor pressure. The dry plus three plutonium oxalate is then heated from room temperature to about 700° C. in two hours in a slow stream of hydrogen plus hydrogen chloride vapor. On larger scales such as 5–10 grams it has been found necessary to carry out the preliminary heating to about 250° C. slowly in order to dehydrate the hydrated oxalate and to reduce splattering. It is sometimes convenient to dehydrate the oxalate overnight in a hydrogen stream at 225° C. and then proceed with the reaction heating. Experiments indicate that the oxalate first dehydrates and is then converted to a plus three chloride-plus three plutonium oxychloride mixture but subsequently converts to the plus three plutonium chloride. The use of hydrogen during the hydrochlorination helps convert the oxychloride to the trichloride. This process causes 100 percent conversion of the hydrated plutonium oxalate to plus three plutonium chloride. The product is light blue in color with a calculated density of 5.70 grams per milliliter, and melts at about 760° C., at which temperature its vapor pressure has been found to be about $7 \times 10^{-3}$ millimeters of mercury. It is somewhat hygroscopic, slowly hydrating in air to form what is apparently $PuCl_3 \cdot 6H_2O$.

Substitution of plutonium tetraoxalate in the example will similarly produce plutonium trichloride.

Another embodiment of the method of this invention is shown in the following example.

EXAMPLE II

A slurry containing about 105 milligrams of plus three plutonium oxalate is heated to dryness in air at about 50° C. Dry hydrogen bromide is passed over the dried oxalate for 2.0 hours at 275° C. While continuing the hydrogen bromide gas flow, the temperature is increased gradually to 425° C. and held for another hour. It is again slowly raised to 550° C. and maintained for one hour. The effect of varying the extent and duration of the reaction temperature can be shown by observing the percent conversion to bromide versus the treatment. This is illustrated by the summary of the data presented in the following table:

Table 1

PERCENT CONVERSION VERSUS HEATING TREATMENT

| Heating treatment: | Percent conversion |
|---|---|
| 2 hours @ 275° C. | 69 |
| 1 hour @ 425° C. additional | 80 |
| 1 hour @ 550° C. additional | 100 |

It may be seen that the temperatures and time during which the temperature is continued directly affects the yield. The plutonium tri-bromide which is formed is a light green solid melting at about 685° C. and volatilizing appreciably from the molten state. It hydrates in air to form $PuBr_3 \cdot 6H_2O$. Its calculated density is 6.69 grams per milliliter. Tetraoxalate in place of trioxalate results in plutonium tetrabromide.

A still further embodiment of the method of the invention is shown in the following example:

EXAMPLE III

One gram of plus three plutonium oxalate is slowly dried to the anhydrous salt by heating it to about 50° C. The anhydrous plutonium oxalate is then treated with a mixture of hydrogen fluoride and hydrogen, while the temperature is advanced in 50° C. increments every ten minutes. The temperature is then maintained at 600° C. for one hour. The plus three plutonium oxalate is one hundred percent converted to the plutonium tri-fluoride which occurs in two forms, a black or gray form and a lavender form. Both of these forms have a calculated density of 9.32 grams per milliliter.

The previous examples have pointed out some embodiments of this invention for preparing plus three plutonium compounds from plutonium trioxalate. In other embodiments of the method of the invention, plus four plutonium compounds may be formed from the trioxalate. One such embodiment is shown in the following example.

EXAMPLE IV 5 grams of plus three plutonium oxalate are dried to the anhydrous salt. A mixture of hydrogen fluoride and air is passed over the anhydrous oxalate while it is heated in 50° C. increments every five minutes to 350° C. The temperature is maintained at this value while the gas flow continues for one hour. The oxalate is 100 percent converted to the tetrafluoride.

In other embodiments of this invention, oxygen may be used with the hydrogen fluoride. This is shown in the following example.

EXAMPLE V 160 grams of plus three plutonium oxalate is dried by heating at 50° C. overnight. It is then placed in the fluorinating furnace and heated to 200° C. A mixture of hydrogen fluoride and air is admitted while the oxalate is heated according to the following schedule:

0.5 hour at 200° C.
0.5 hour at 300° C.
0.5 hour at 400° C.
0.5 hour at 500° C.
1 hour at 600° C.

When treated according to this method a 96 percent yield of plutonium tetrafluoride results.

The plutonium tetrafluoride produced by either of these embodiments shown in Examples IV and V has a density calculated from the lattice constants of 7.0 grams per milliliter. The tetrafluoride is readily converted at an elevated temperature to trifluoride if hydrogen is present.

Tetraoxalate in Examples IV and V will also produce the corresponding tetrahalide salt.

In other embodiments of the method of this invention, hydrogen cyanide vapor is used instead of the various hydrohalides and a plutonium cyanide results. The product may be a plus three or plus four cyanide depending on the original valence of the oxalate and the oxidation conditions during the conversion as indicated in the examples.

The foregoing examples and procedures are given for the purpose of illustrating the present invention but are not intended to be limiting on the scope thereof. Since many widely different embodiments of the invention can be made without departing from the spirit and scope thereof, it is to be understood that this application is not to be limited except as indicated in the appended claims.

What is claimed is:

1. The process of converting lower valence plutonium oxalates to non-oxygenated salts of plutonium which comprises heating lower valence plutonium oxalate in the presence of a vapor of a volatile non-oxygenated monobasic acid.

2. The process of converting a lower valence plutonium oxalate to the plutonium salt of that lower valence state which comprises heating the lower valence plutonium oxalate to a temperature of from 300° C. to 700° C. under conditions which are neither oxidizing nor reducing in the presence of a vapor of a volatile non-oxygenated monobasic acid.

3. The process of converting plus three plutonium oxalates to plus three non-oxygenated salts of plutonium which comprises heating plus three plutonium oxalate under non-oxidizing conditions in the presence of a vapor of a volatile non-oxygenated monobasic acid.

4. The process of converting plus four plutonium oxalates to plus three non-oxygenated salts of plutonium which comprises heating plus four plutonium oxalate under reducing conditions in the presence of a vapor of a volatile non-oxygenated monobasic acid.

5. The process of converting plus three plutonium oxalates to plus four non-oxygenated salts of plutonium which comprises heating plus three plutonium oxalate under oxidizing conditions in the presence of a vapor of a volatile non-oxygenated monobasic acid.

6. The process of converting plus three plutonium oxalates to plus three non-oxygenated salts of plutonium which comprises heating plus three plutonium oxalate to a temperature of from 300° C. to 700° C. under non-oxidizing conditions in the presence of a vapor of a volatile non-oxygenated monobasic acid.

7. The process of converting plus four plutonium oxalates to plus three non-oxygenated salts of plutonium which comprises heating plus four plutonium oxalate to a temperature of from 300° C. to 700° C. under reducing conditions in the presence of a vapor of a volatile non-oxygenated monobasic acid.

8. The process of converting plus three plutonium oxalate to plus four non-oxygenated salts of plutonium which comprises heating plus three plutonium oxalate to a temperature of from 300° C. to 700° C. under oxidizing conditions in the presence of a vapor of a volatile non-oxygenated monobasic acid.

9. The process of converting a plus three plutonium oxalate to plus three plutonium chloride which comprises heating plus three plutonium oxalate under non-oxidizing conditions in the presence of a vapor of hydrogen chloride.

10. The process of converting plus four plutonium oxalate to plus three plutonium bromide which comprises heating the plus four plutonium oxalate under reducing conditions in the presence of a vapor of hydrogen bromide.

11. The process of converting a plus three plutonium oxalate to a plus four plutonium fluoride which comprises heating plus three plutonium oxalate under oxidizing conditions in the presence of a vapor of hydrogen fluoride.

12. The process of converting plus three plutonium oxalates to plus three plutonium chloride which comprises heating plus three plutonium oxalate to a temperature of from 300° C. to 700° C. under non-oxidizing conditions in the presence of a vapor of hydrogen chloride.

13. The process of converting plus four plutonium oxalates to plus three plutonium bromide which comprises heating plus four plutonium oxalate to a temperature of from 300° C. to 700° C. under reducing conditions in the presence of a vapor of hydrogen bromide.

14. The process of converting plus three plutonium oxalate to plus four plutonium fluoride which comprises heating plus three plutonium oxalate to a temperature of from 300° C. to 700° C. under oxidizing conditions in the presence of a vapor of hydrogen fluoride.

15. The process of converting plus three plutonium oxalates to plus three plutonium chloride which comprises heating plus three plutonium oxalate to a temperature of from 300° C. to 700° C. in the presence of a vapor of hydrogen chloride.

16. The process of converting plus four plutonium oxalates to plus three plutonium bromide which comprises heating plus four plutonium oxalate to a temperature of from 300° C. to 700° C. in the presence of a vapor of hydrogen and hydrogen bromide.

17. The process of converting plus three plutonium oxalate to plus four plutonium fluoride which comprises heating plus three plutonium oxalate to a temperature of from 300° C. to 700° C. in the presence of a vapor of oxygen and hydrogen fluoride.

18. The process of converting lower valence plutonium oxalates to non-oxygenated salts of plutonium which comprises heating lower valence plutonium oxalate in the presence of a vapor of a volatile non-oxygenated monobasic acid under controlled oxidation-reduction conditions.

19. The process of converting lower valence plutonium oxalates to non-oxygenated salts of plutonium which comprises heating lower valence plutonium oxalate to a temperature of from 300° C. to 700° C. in the presence of a vapor of a volatile non-oxygenated monobasic acid under controlled oxidation-reduction conditions.

References Cited in the file of this patent

Seaborg: "Chemical and Engineering News," vol. 23, No. 23, pp. 2190–2193, December 10, 1945.

Seaborg et al.: "The Actinide Elements," pp. 376, 377, 430 (1954), publ. by McGraw-Hill Book Co., N. Y.

Johns and Moulton, AEC declassified Paper No. La–193, dated December 20, 1944 (declassified authority of letter filed February 1, 1957, Paper No. 13), 20 pages. Only copy available is that filed by applicant, part of Paper No. 12.